(12) United States Patent
Fleury, Jr. et al.

(10) Patent No.: US 7,516,751 B2
(45) Date of Patent: *Apr. 14, 2009

(54) WET BARREL FIRE HYDRANT FLOW PREVENTER

(75) Inventors: Leo W. Fleury, Jr., N. Smithfield, RI (US); John C. McCreary, Altadena, CA (US)

(73) Assignee: James Jones Company, El Monte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/842,374

(22) Filed: Aug. 21, 2007

(65) Prior Publication Data

US 2008/0023072 A1  Jan. 31, 2008

Related U.S. Application Data

(63) Continuation of application No. 11/545,140, filed on Oct. 10, 2006, now Pat. No. 7,267,136, which is a continuation-in-part of application No. 10/741,866, filed on Dec. 19, 2003, now Pat. No. 7,128,083.

(60) Provisional application No. 60/435,433, filed on Dec. 20, 2002.

(51) Int. Cl.
 *F16K 17/14* (2006.01)
 *E03B 9/02* (2006.01)

(52) U.S. Cl. ........................................ 137/71; 137/272

(58) Field of Classification Search ............. 137/68.14, 137/71, 68.15, 300, 272, 330
See application file for complete search history.

(56) References Cited

U.S. PATENT DOCUMENTS

| | | | |
|---|---|---|---|
| 1,800,010 A | 4/1931 | Emerson | |
| 2,054,561 A | 9/1936 | Greenberg | |
| 2,249,848 A | 7/1941 | O'Brien | |
| 3,104,554 A | 9/1963 | Mueller et al. | |
| 3,439,938 A | 4/1969 | Dunton | |
| 3,586,019 A | 6/1971 | Thomas et al. | |
| 3,961,642 A * | 6/1976 | Thomas et al. | 137/272 |
| 3,980,097 A | 9/1976 | Ellis | |
| 4,072,163 A | 2/1978 | Byrnes | |
| 4,112,966 A | 9/1978 | Carlson | |
| 4,127,142 A | 11/1978 | Snider | |
| 4,562,962 A | 1/1986 | Hartman | |
| 4,596,263 A | 6/1986 | Snider | |
| 4,886,087 A | 12/1989 | Kitchen | |
| 5,103,853 A | 4/1992 | McGushion et al. | |
| 5,609,179 A | 3/1997 | Knapp | |
| 5,769,116 A | 6/1998 | Yokota et al. | |
| 6,058,957 A * | 5/2000 | Honigsbaum | 137/1 |
| 7,128,083 B2 | 10/2006 | Fleury, Jr. et al. | |
| 7,267,136 B2 | 9/2007 | Fleury, Jr. et al. | |

* cited by examiner

*Primary Examiner*—John Rivell
*Assistant Examiner*—Craig M Schneider
(74) *Attorney, Agent, or Firm*—Alston & Bird, LLP

(57) ABSTRACT

The present invention provides a fluid flow prevention apparatus for a wet barrel fire hydrant which is simple and inexpensive to install and effectively cuts off water flow while reducing water hammer. The fluid flow apparatus includes an in-line or non-hinged valve member for closing a flow passageway connected to the hydrant that is operably movable from an open to closed position upon damage to the hydrant. An adjustable damping member controls the rate of closing of the valve member to reduce the effects of water hammer.

15 Claims, 3 Drawing Sheets

WET BARREL FIRE HYDRANT FLOW PREVENTER

CROSS REFERENCE TO RELATED APPLICATIONS

This application is a continuation of U.S. patent application Ser. No. 11/545,140, filed 10 Oct. 2006, which is a continuation-in-part of U.S. patent application Ser. No. 10/741,886, filed 19 Dec. 2003 (now U.S. Pat. No. 7,128,083), which claims the benefit of U.S. Provisional Patent Application Ser. No. 60/435,433, filed 20 Dec. 2002, the entire contents and substance of which are all incorporated herein.

BACKGROUND OF THE INVENTION

1. Field of the Invention

The present invention relates generally to a flow prevention apparatus for damaged fire hydrants, and more particularly, to an adjustable flow prevention apparatus for a wet barrel fire hydrant where damage to the water system elements is avoided while shut off of water flow from a damaged hydrant is simultaneously achieved.

2. Description of the Related Art

There are two basic types of fire hydrants manufactured today. These two types are commonly referred to in the trade as the "wet" barrel or "California" fire hydrant and the dry barrel fire hydrant. As the name implies, wet barrel fire hydrants are always supplied with water under pressure from a municipal, or other supply, water system. As such, it is the practice to install this type of fire hydrant only in milder climates where there is no chance of freezing. Because wet hydrants are constantly supplied with water, however, damage to the hydrant can result in a considerable loss of water before the damaged hydrant is discovered and repaired.

Where the climate is dry, or where drought conditions prevail for any length of time, manufacturers of wet hydrants have endeavored to provide flow cut off devices to prevent loss of water in the event of damage to the barrel, such as may result from a vehicle collision. Unfortunately, the probability of such events occurring is quite high due to the standard location of hydrants adjacent the street curbs to facilitate rapid access by fire department personnel in the event of a fire emergency. Therefore, in the construction of wet barrel hydrants, manufacturers have proposed the use of cut off valves that are actuated in response to a pressure drop which will occur when, for example, the barrel is broken off from the supply pipe. In other arrangements, a valve is actuated by a mechanical linkage between the barrel and the cut off valve so that when the barrel is removed, such as by a vehicular collision or similar event, the valve will be quickly shut to prevent any significant water loss.

With these and other devices, however, damage to the pipes and valves in the system can occur as a result of the high pressure that these elements experience due to the sudden closing of a supply pipe when the cut off valve is actuated as a result of the abrupt change in flow velocity of the water. Such an abrupt change produces what is commonly referred to as water hammer. Water hammer refers to the pressure fluctuations associated with the change between the kinetic energy of moving water and pressure energy, which may be either positive or negative. When the water in the pipe is stopped abruptly, considerable force is exerted on the valve and oscillating shock waves are reflected back into the municipal water system. The tremendous forces associated with water hammer can destroy the valve and damage other seals and pipes throughout the water system.

Accordingly, systems have been developed to reduce the effects of water hammer. In some systems, it has been proposed to provide an upstream cut off valve that can be actuated gradually or even manually to prevent such water hammer damage. These arrangements, however, can result in substantial down stream water loss through the broken hydrant which is clearly undesirable in areas suffering drought and may also require cut off of flow to undamaged hydrants as well.

In other arrangements, water cut off devices have been proposed which are warranted to cut off flow to a damaged hydrant but such devices are often difficult and expensive to install particularly in older, established water systems. For example, U.S. Pat. Nos. 4,127,142 and 4,596,263 both disclose wet barrel systems that utilize a dash-pot assembly connected to a "swing check" or flapper type valve. The valve is biased toward the closed position by a spring and is held open and out of the flow passageway by a holding bar connected to the upper barrel of the hydrant. If the hydrant is sheared from its support, the holding bar releases the flapper valve and the spring urges the valve into the flow passageway. The valve then closes due to the resulting change in water pressure, while the dash-pot assembly prevents rapid closure of the valve.

Although the systems disclosed by U.S. Pat. Nos. 4,127,142 and 4,596,263 reduce the effects of water hammer, they still have limitations. For example, if the hydrant is merely damaged, rather than completely sheared off, the holding bar may actually prevent the valve from closing. In addition, the above systems require an underground barrel with a lateral chamber to accommodate the arrangement of the dash-pot assembly. Such an arrangement makes the use of the disclosed systems more difficult and expensive to install with existing water systems and/or with systems of different sizes or types. Finally, once the dash-pot assembly is installed, the restrictive rate of closure of the flapper valve cannot be adjusted.

What is needed then, is an adjustable cut off valve for a wet barrel hydrant which is simple to install and relatively inexpensive, and that will effectively cut off water flow without causing water hammer in the accompanying system. It is to such a device that the present invention is primarily directed.

SUMMARY OF THE INVENTION

The present invention provides a fluid flow prevention apparatus for a wet barrel fire hydrant which is simple to install and relatively inexpensive, yet will effectively cut off water flow without causing water hammering of the system's elements. The fluid flow prevention apparatus includes a valve member for closing the flow passageway of a pipe connected to a wet barrel fire hydrant. The valve member is positioned in-line with the flow passageway of the pipe and is operably movable from an open to closed position upon damage to the hydrant. An adjustable damping member controls the rate of closing of the valve member to reduce the effects of water hammer when the valve member closes.

The fluid flow prevention apparatus may also include a tube member extending through the in-line valve member. One end of the tube member is in fluid communication with the flow passageway of the pipe while the other end of the tube member is in fluid communication with the hydrant to allow reduced fluid flow through the tube member when the valve member is closed. Accordingly, a signal stream of fluid is provided from the tube member for identifying the damaged hydrant.

DETAILED DESCRIPTION

Figure 1:
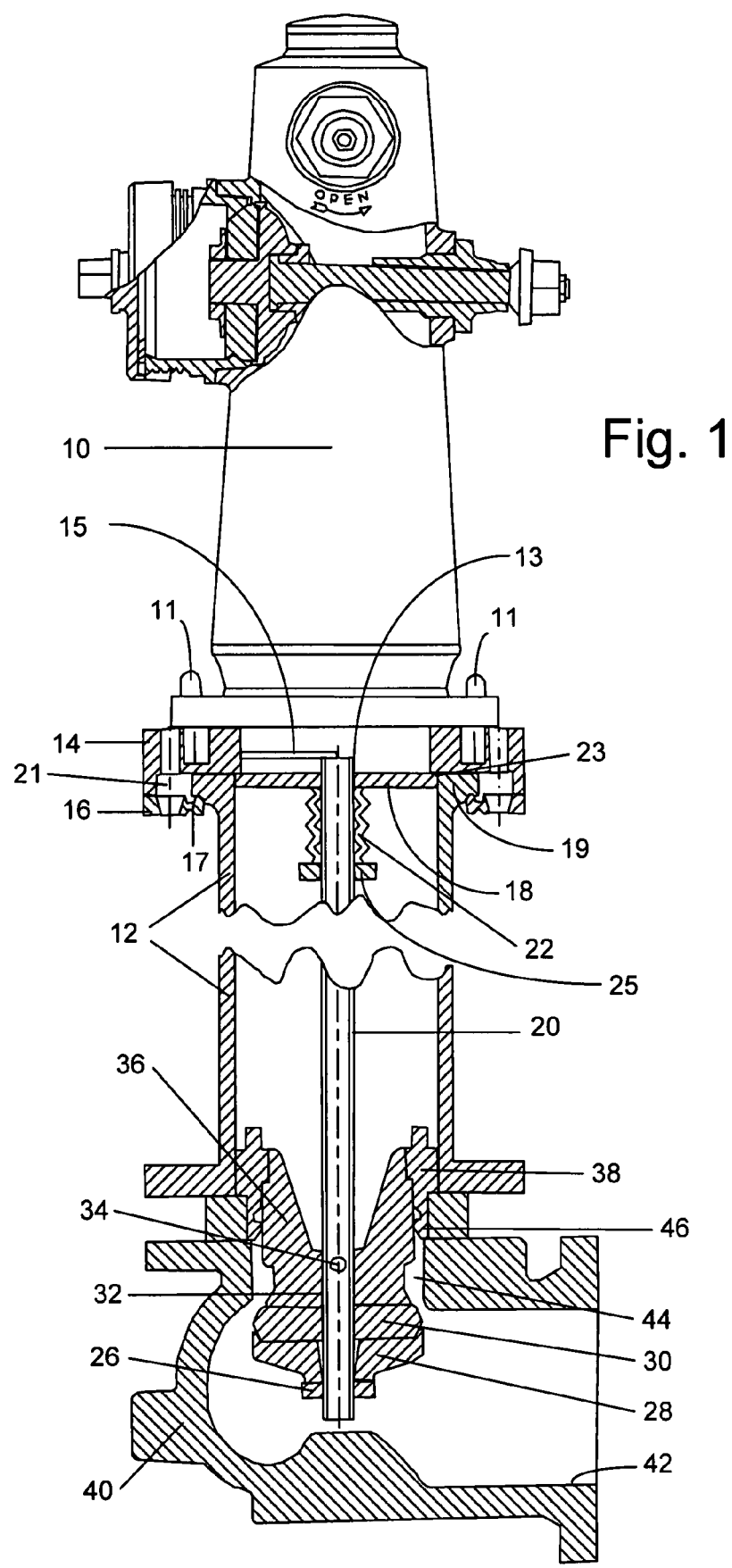
FIG. 1 shows an elevational view, partly in section, of an embodiment of the device of the present invention.

Referring to the figures, wherein like numerals represent like parts, there is shown in FIG. 1, a standard wet barrel hydrant 10 which is secured, for example, by threaded bolts 11 to a plate 14 which is mounted on the upper end of an underground barrel 12. Typically, the plate 14 is attached to a break off bracket 16 which includes an inner, annular flange 17 engaging in a grove provided in an radially extending flange 19 formed on the upper end of the underground barrel 12 as shown. With this arrangement, in the event of a collision or other force imposed on the upper barrel or hydrant 10, the flange 17 will yield to allow the plate 14 to be released from the upper end of the underground barrel 12.

Typically, the break off bracket 16 will be secured to the plate 14 by threaded bolts inserted through the threaded apertures 21. The plate 14 has an opening with an inside diameter slightly smaller in size than the diameter of the upper end of the underground barrel 12. With this arrangement, a guide member in the form of a plate or bar 18 may be secured to the edge of the opening of underground barrel 12 as at 23. The manner of attachment may be by welding or any other suitable method of attachment. A tube 20, which is threaded at opposite ends, extends through a central aperture 13 provided in the guide member 18.

A nut 25 is threadedly engaged on the tube 20, on the upper end thereof, at a distance from the upper end of tube 20. An adjustable damping member 22 is provided between the nut 25 and the underside of the guide member 18. It will be understood, of course, that the guide member 18 may simply be a bar extending across the opening to the plate 14 at the upper end of the underground barrel 12, or it may take the form of an apertured plate so that flow of water to the upper barrel 10 will be unimpeded.

The lower end of the tube 20 is also threaded to cooperate with a nut 26 that is located at the base of an opening 32 extending centrally through an in-line valve member 28 of conventional construction. One such hydrant valve is described in our U.S. Pat. No. 3,980,097 of Sep. 14, 1976, the disclosure of which is incorporated herein by reference in its entirety. The term "in-line" as used herein to describe the valve member is defined as any valve that is non-hinged and aligned axially with the direction of fluid flow. As is conventional, the in-line valve member 28 includes a sealing disc 30 surrounding the central opening 32 formed in the in-line valve member 28. The tube 20 extends through the opening 32 to connect and be secured to the in-line valve member 28 by the nut 26. An additional attachment between the in-line valve body and the tube 20 may also be provided, such as by a dowel pin as shown at 34.

The in-line valve member 28 is, as noted above, of conventional construction and may include a set of a upstanding ears 36 which cooperate with a seating ring 38 which serves to guide the in-line valve 28 in its movement between open and closed positions in the valve housing, or shoe 40. The valve housing 40 has an opening 42 which is in use supplied with water under pressure from a municipal or other supply water system. The outlet of the housing 40 at 44 will be closed when the seal 30 contacts under pressure the rim 46 of the seat 38 of the valve housing 40 effectively preventing water from entering the flow passageway of underground barrel 12. Although housing 40 is shown in a horizontal configuration, the housing may also be vertical or of any other suitable configuration.

As shown in FIG. 1, the in-line valve 28 is in an open position so that the water entering the valve housing 40 through its opening 42 will pass through the seat 46 to fill the underground barrel 12 as well as the aboveground barrel or hydrant 10. Holding member 15 engages the tube 20 to maintain the in-line valve 28 in an open position, so that the valve will remain open for normal operation of the hydrant. Holding member 15 may be attached to hydrant 10 or to plate 14 as a separate or integral member, and has a predetermined retention force for maintaining valve 28 in an open position during normal hydrant operation. In the event that the upper barrel or hydrant 10 is removed, such as by collision with a vehicle, water would normally flow freely through the underground barrel 12 to the exterior and be lost. According to the present invention, however, holding member 15 is removed along with hydrant 10 releasing the tube 20, and water pressure acting on the lower end portion of the in-line valve 28 will move the valve 28 upward toward a closed position bringing the sealing disc 30 into engagement with the seat 46 to cut off fluid flow from the valve housing 40 to underground barrel 12.

Because the valve member 28 is provided in-line with the flow passageway of underground barrel 12, the flow of water around and over valve member 28 is generally uniform during closing of the valve. Accordingly, the water hammering effects associated with the closing of in-line valve member 28 are less than those produced by the closing of conventional hinged or flapper type valves where the water flow is non-uniform. To further prevent water hammer or sudden pressure buildup upstream of the valve housing 40, the closing of the in-line valve member 28 is restrained by an adjustable damping member 22 disposed between the underside of the guide member 18 and the adjustable nut 25 mounted on the tube 20.

Figure 3:
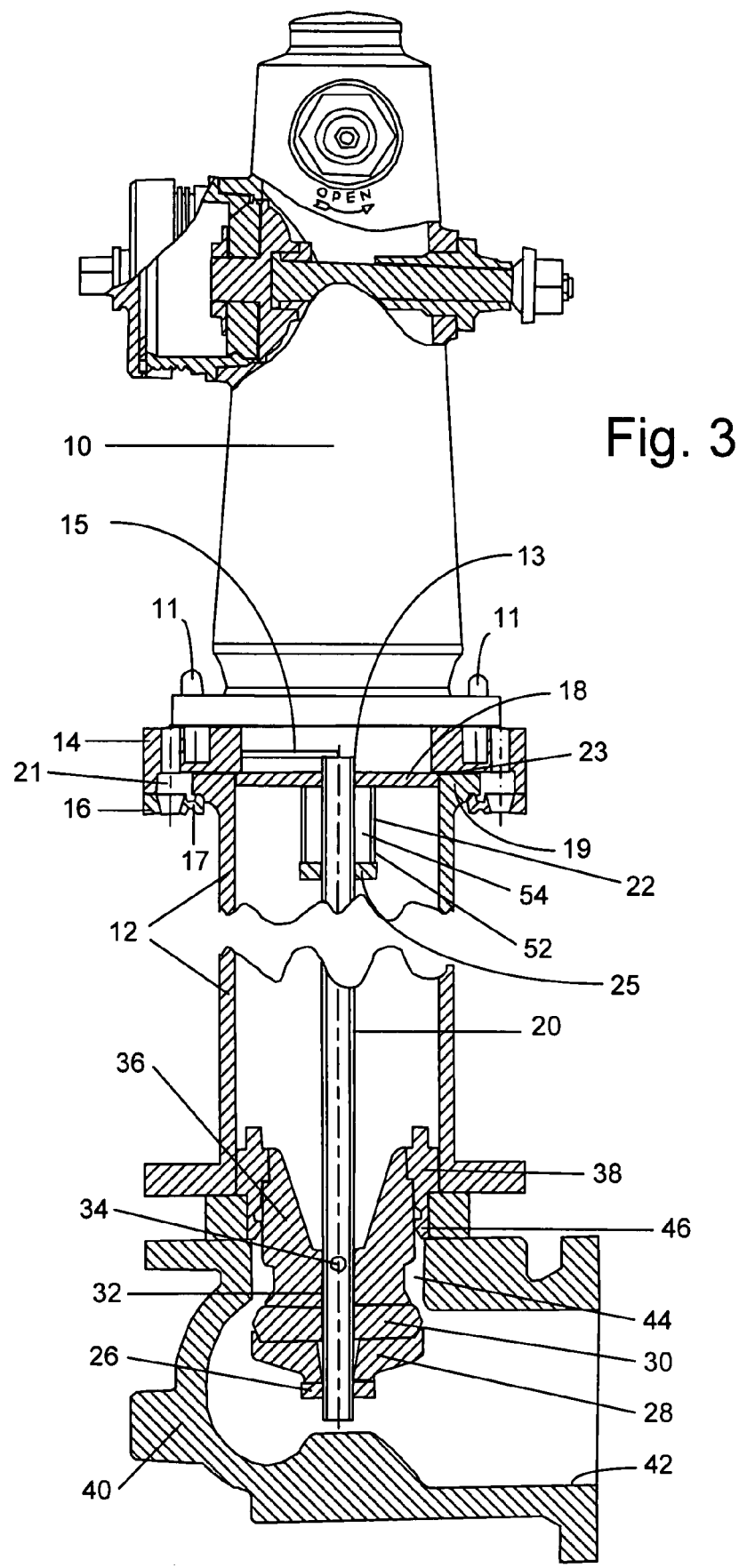
FIG. 3 shows an elevational view, partly in section, of an embodiment of the device having an adjustable damping member comprising an adjustable tubular body filled with viscous fluid.

In the preferred embodiment, adjustable damping member 22 is a helical spring disposed, as shown, with one end of the spring in engagement with the underside of the guide member 18 and the other end resting on the upper side of the nut 25. Other types of damping devices such as a tubular body 52 filled with a viscous fluid 54, as illustrated in FIG. 3, can be disposed about the tube 20 to provide a damping action on the upward movement of the in-line valve 28 in the event that hydrant 10 is accidentally removed. Adjustment of the damping action is advantageously effected by adjusting the nut 25 to increase or decrease the resistance to movement of the tube 20 through the opening 13 provided in the guide member or plate 18 and consequent movement of the in-line valve member 28 upwardly towards the valve seat 46. Normally, the damping device will be under no compression in order to prolong the useful life of the damper.

Figure 2:
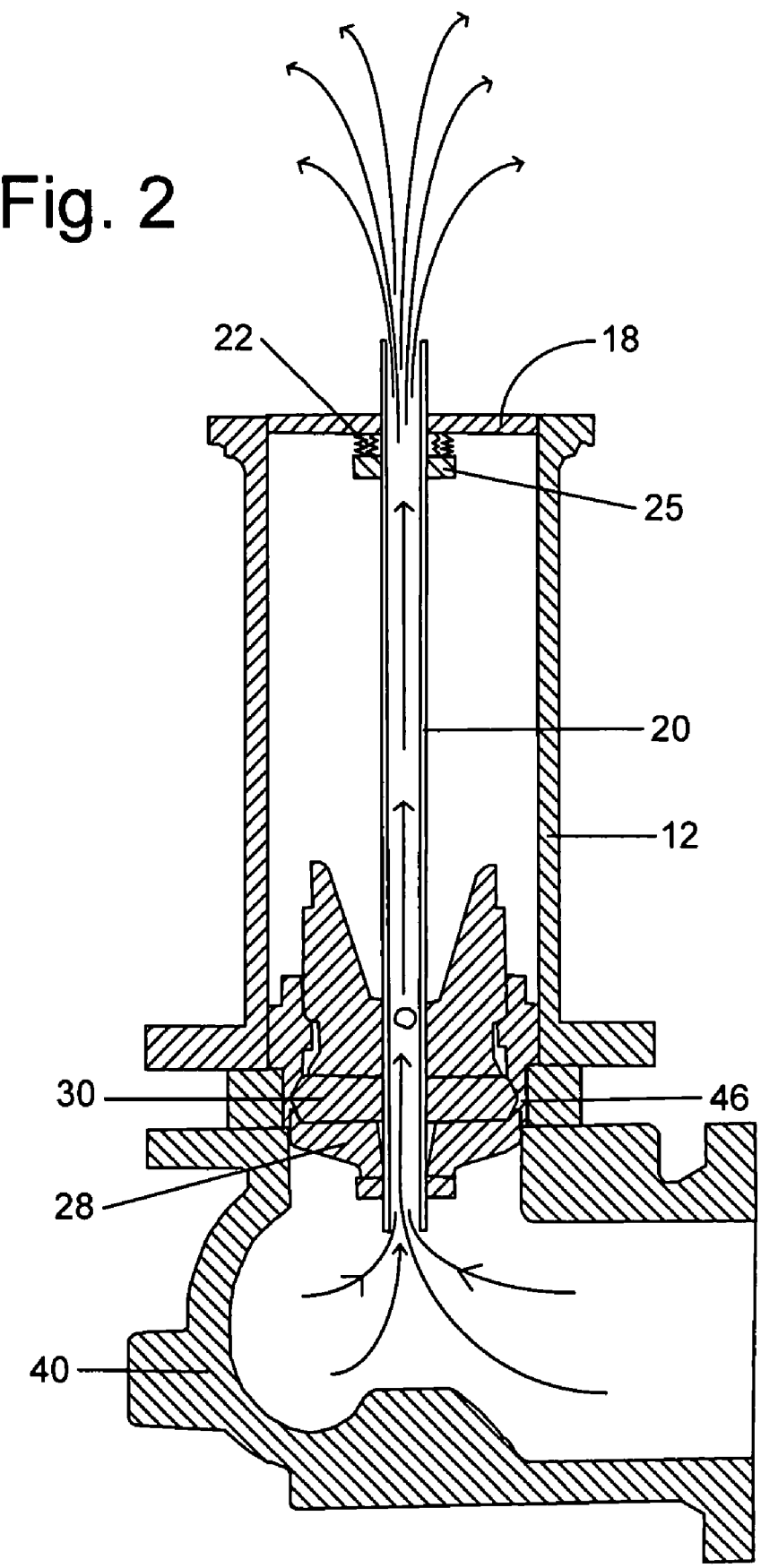
FIG. 2 shows an elevational view, partly in section, of the embodiment shown in FIG. 1 with the valve in the closed position.

Referring now to FIG. 2, valve member 28 is shown in a closed position. Hydrant 10, and plate 14 have been removed, such as by collision with a vehicle. Because holding member 15 is attached to either hydrant 10 or plate 14, tube 20 has been released and water pressure has moved in-line valve member 28 into a closed position. Sealing disc 30 is shown in engagement with rim 46 effectively cutting off the main fluid flow to underground barrel 12. Tube 20 allows reduced fluid flow (as shown with arrows) from housing 40 to the outside. Such an arrangement further reduces the effects of water hammer because a small amount of water is allowed to exit the water system through tube 20. This small stream of water also provides an identification stream indicating that the hydrant is damaged and repair is needed.

The designs of the different embodiments of the present invention allow existing water systems to be easily and inexpensively fitted with the flow prevention apparatus described herein because wet barrel fire hydrants with specially shaped underground barrels are not required due to the in-line positioning of the valve and damping member. As stated above, the damping member is also adjustable enabling additional control over the rate of closing of the valve member by simply adjusting the amount of resistance provided by the damping member. Accordingly, the damping member can provide effective resistance for reducing water hammer in water systems with pipes of various sizes, shapes, and diameters.

Numerous characteristics and advantages have been set forth in the foregoing description, together with details of structure and function. While the invention has been disclosed in its preferred form, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved especially as they fall within the breadth and scope of the claims here appended.

What is claimed is:

1. A fluid flow prevention apparatus for use with a wet barrel fire hydrant which is in communication with a barrel defining a flow passageway, the fluid flow prevention apparatus comprising:
   a valve member positioned within the flow passageway such that fluid flowing within the barrel flows substantially uniformly around the valve member and wherein the valve member is moveable from a normally open position to a closed position;
   a stem member having a first end attached to the valve member and a second end positioned downstream of the valve member;
   a holding member configured to engage the second end of the stem member such that the valve member is held in an open position and wherein the holding member is substantially stationary relative to the hydrant and wherein the holding member is configured to disengage the second end of the stem member in response to damage to the hydrant.

2. The fluid flow prevention apparatus of claim 1 further comprising a guide member positioned downstream of said valve member and configured to position the stem member into engagement with the holding member.

3. The fluid flow prevention apparatus of claim 1, wherein the stem member defines a conduit therethrough and wherein the stem member extends through the valve member such that the conduit is in fluid communication with the passageway upstream of the valve such that if the hydrant is damaged, a reduced flow of fluid passes through the stem member when the valve member is in the closed position.

4. The fluid flow prevention apparatus of claim 1, wherein the holding member is attached to the hydrant.

5. A fluid flow prevention apparatus for use with a wet barrel fire hydrant which is in communication with a barrel defining a flow passageway, the fluid flow prevention apparatus comprising:
   a valve member positioned within the flow passageway such that fluid flowing within the barrel flows substantially uniformly around the valve member and wherein the valve member is moveable from a normally open position to a closed position;
   a stem member having a first end attached to the valve member and a second end positioned downstream of the valve member;
   a holding member configured to engage the second end of the stem member such that the valve member is retained in an open position and wherein the holding member is configured to disengage the second end of the stem member in response to damage to the hydrant; and
   a guide member positioned downstream of the valve member and configured to position the stem member into engagement with the holding member.

6. The fluid flow prevention apparatus of claim 5, wherein the guide member defines an aperture sized to accept the stem member.

7. The fluid flow prevention apparatus of claim 6, wherein the guide member is a bar extending across the flow passageway.

8. The fluid flow prevention apparatus of claim 5, wherein the stem member defines a conduit therethrough and wherein the stem member extends through the valve member such that the conduit is in fluid communication with the passageway upstream of the valve such that if the hydrant is damaged, a reduced flow of fluid passes through the stem member when the valve member is in the closed position.

9. The fluid flow prevention apparatus of claim 5, wherein the holding member is attached to the hydrant.

10. The fluid flow prevention apparatus of claim 6 further comprising a damping member engaging said stem member and said guide member, wherein the damping member is configured to control the rate of closing of the valve.

11. The fluid flow prevention apparatus of claim 10, wherein the damping member is adjustable.

12. A fluid flow prevention apparatus for use with a wet barrel fire hydrant which is in communication with a barrel defining a flow passageway, the fluid flow prevention apparatus comprising:
   a valve member positioned within the flow passageway such that fluid flowing within the barrel flows substantially uniformly around the valve member and wherein the valve member is moveable from a normally open position to a closed position;
   a stem member extending through the valve member such that a first end is in fluid communication with the passageway upstream of the valve member and a second end is positioned downstream of the valve member, wherein the stem member defines a conduit such that if the valve member is closed, a reduced flow of fluid passes through the conduit in the stem member; and
   a holding member configured to engage the second end of the stem member such that the valve member is retained in an open position and wherein the holding member is configured to disengage the second end of the stem member in response to damage to the hydrant thereby allowing the valve member to close in response to water pressure acting on the valve.

13. The fluid flow prevention apparatus of claim 12 further comprising:

a guide member positioned upstream of said valve member and configured to position the stem member into engagement with the holding member.

14. The fluid flow prevention apparatus of claim 13, wherein the guide member defines an aperture sized to accept the stem member.

15. The fluid flow prevention apparatus of claim 13, wherein the guide member is a bar extending across the flow passageway.

* * * * *